United States Patent
Goldman et al.

(10) Patent No.: US 6,796,724 B2
(45) Date of Patent: Sep. 28, 2004

(54) SLEEVE FOR PIG-TAILING OPTICAL FIBER

(75) Inventors: Arnold E. Goldman, Calabasas, CA (US); K. Juergen Flamm, Tarzana, CA (US); John G. Mark, Pasadena, CA (US); Ike Song, Montebello, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/917,578

(22) Filed: Jul. 28, 2001

(65) Prior Publication Data

US 2002/0015567 A1 Feb. 7, 2002

Related U.S. Application Data

(60) Provisional application No. 60/221,323, filed on Jul. 28, 2000.

(51) Int. Cl.[7] ............................... G02B 6/36; G02B 6/42
(52) U.S. Cl. ............................... 385/91; 385/49; 385/52
(58) Field of Search ............................... 385/91, 2, 139, 385/78, 77, 138, 123, 126, 132, 88, 31, 80, 89, 92, 49

(56) References Cited

U.S. PATENT DOCUMENTS

| | | | |
|---|---|---|---|
| 4,779,947 A | | 10/1988 | Ito ............................... 350/96.2 |
| 4,969,702 A | * | 11/1990 | Anderson ........................ 385/33 |
| 5,042,895 A | * | 8/1991 | Chouinard et al. ............ 385/2 |
| 5,065,011 A | * | 11/1991 | Fujihara et al. ............... 385/49 |
| 5,305,413 A | * | 4/1994 | Payne ........................... 385/128 |
| 5,621,835 A | * | 4/1997 | Takahashi et al. ............. 385/49 |
| 5,689,608 A | * | 11/1997 | Moore et al. ................. 385/139 |

FOREIGN PATENT DOCUMENTS

| | | |
|---|---|---|
| DE | 197 35 683 | 2/1999 |
| JP | 02 113212 | 4/1990 |
| JP | 05 107425 | 4/1993 |
| WO | WO 96 02861 | 2/1996 |

* cited by examiner

Primary Examiner—Georgia Epps
Assistant Examiner—William Choi
(74) Attorney, Agent, or Firm—Lewis B. Sternfels

(57) ABSTRACT

A sleeve (22) enables attachment of an optic fiber (14) to a multi-integrated optic chip (10) in optical communication therewith, and maintains alignment of the fiber at its end adjacent the chip. The sleeve includes a symmetrically-shaped cavity (26) bounded by termini (30, 32) which are respectively disposed to fit onto the chip and to accept the fiber. An adhesive (46) within the cavity symmetrically bonds the fiber to the chip. The adhesive cures symmetrically in the cavity, to eliminate undesired motion of the fiber from its preferred alignment position vis-a-vis the chip connection point (12) or to provide a repeatable motion to achieve the optimum alignment position of the fiber with respect to the chip. The sleeve may be left in place or, alternatively, it may be removed. The sleeve controls, defines and confines the index matching adhesive and/or fluid between fiber end (44) and connection point (12) by defining the areas and volume actually in contact with the adhesive or fluid. Symmetry is preserved over the effects of gravity and wicking which heretofore have prevented a very symmetrical pigtail which is necessary for performance and repeatability.

7 Claims, 1 Drawing Sheet

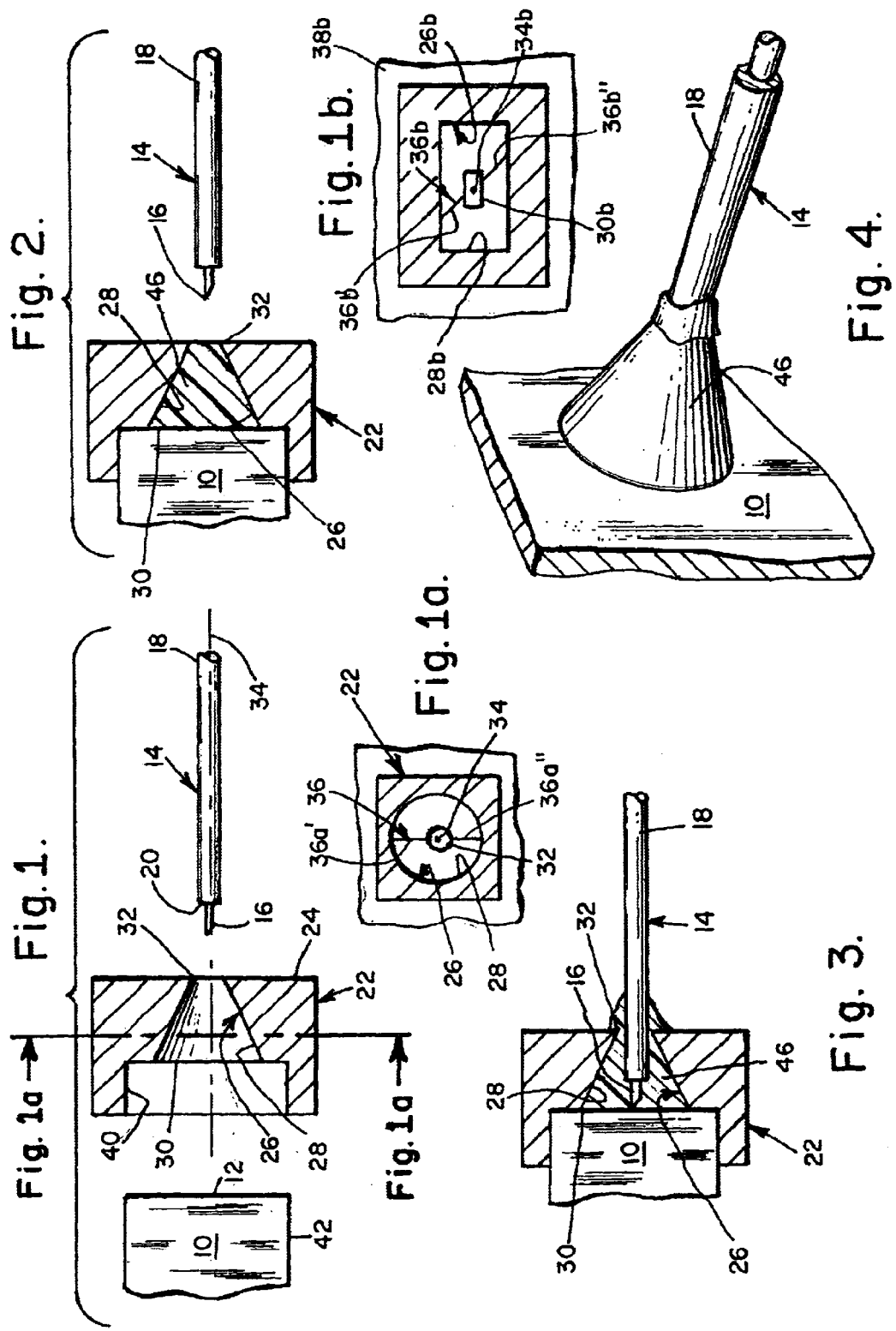

SLEEVE FOR PIG-TAILING OPTICAL FIBER

CROSS-REFERENCE TO RELATED APPLICATION

This application claims the benefit of U.S. Provisional Application No. 60/221,323, filed Jul. 28, 2000.

REFERENCE REGARDING FEDERAL SPONSORSHIP

Not Applicable

REFERENCE TO MICROFICHE APPENDIX

Not Applicable

BACKGROUND OF THE INVENTION

1. Field of the Invention

The present invention relates to attachment or "pig-tailing" of optical fibers to multi-integrated optic chips and, more particularly, to improvements in the quality of pig-tailing.

2. Description of Related Art and Other Considerations

The attachment of an optic fiber to a chip, e.g., a multi integrated optic chip (MIOC), employs the use of an index matching adhesive or fluid. The chip includes a connection point to which the optic fiber is secured. It is important that the attachment be free from undue irregularity, or from not being symmetrical. For example, if the adhesive is not evenly applied, its curing may cause movement between the optic fiber and the connection point and attenuate or otherwise impair flow of optic energy to or from the chip, with consequent loss of performance and repeatable operation.

SUMMARY OF THE INVENTION

These and other problems are successfully addressed and overcome by the present invention by utilizing a symmetrically shaped sleeve to aid in the attachment of the fiber to the chip. Specifically, the sleeve assists the accurate and precise attachment by the adhesive or fluid, which is index matched to the chip and the optic fiber.

More specifically, the sleeve is provided with a symmetrical interior cavity, and is attached to the chip at one end. On the other end, the sleeve accepts and is attached to one or more fibers. The sleeve may be temporarily or permanently attached after hardening of the adhesive. The inside cavity is symmetrically shaped about the fiber and the adhesive bonded to the fiber. It confines, controls and defines the adhesive or fluid between the fiber end and the chip end of the connection point. It defines the areas and volume actually in contact with the adhesive or fluid.

Several advantages are achieved by use of the sleeve. The symmetrically shaped inside cavity surrounding the fiber ensures that the adhesive will cure symmetrically in this position and eliminate any undesired motion of the fiber from the preferred alignment position or to provide a repeatable motion to achieve the optimum alignment position of the fiber with respect to the chip. By precisely controlling the volume and position of the adhering material, symmetry is preserved over the effects of gravity and wicking which heretofore have prevented a very symmetrical pigtail. Such a symmetrical pigtail is necessary for performance and repeatability.

Other aims and advantages, as well as a more complete understanding of the present invention, will appear from the following explanation of exemplary embodiments and the accompanying drawings thereof.

BRIEF DESCRIPTION OF THE DRAWINGS

FIG. 1 is an exploded view of a multi-integrated optic chip (MIOC), an optic fiber with stripped end, and a preferred embodiment of pig-tailing sleeve between the chip and the optic fiber, all aligned in preparation for attachment of the fiber to the chip;

FIG. 1a is a cross-sectional view of the sleeve depicted in FIG. 1 taken along line 1a—1a thereof, in which the sleeve cavity whose interior wall is shaped as a truncated right circular cone;

FIG. 1b is a cross-sectional view of a sleeve alternately shaped to that depicted in FIGS. 1 and 1a, but having a sleeve cavity whose interior wall is shaped as a truncated pyramid;

FIG. 2 is a view of the assembly depicted in FIG. 1, showing the sleeve positioned on the chip, and a bonding agent contained within the sleeve and in contact with the chip;

FIG. 3 is a view similar to FIG. 2, of the completed assembly with the fiber bonded to the chip and retained within the sleeve; and FIG. 4 is a completed assembly, alternate to that illustrated in FIG. 3, showing the sleeve removed.

DETAILED DESCRIPTION OF THE PREFERRED EMBODIMENTS

Accordingly, as shown in FIG. 1, a chip 10, such as a multi integrated optic chip (MIOC) is conventionally provided with a connection point 12 used for attachment to an optic fiber core, such as is contained in an optic fiber 14. Atypical optic fiber includes a core 16 surrounded with protective cladding and jacket, generally designated by indicium 18. The core is stripped at an end 20 of the fiber to permit the core to be secured to the connection point.

A sleeve 22 is used to properly and symmetrically affix the core to the connection point. Sleeve 22 includes a body 24 having a symmetrically-shaped cavity 26 having an interior wall 28 bounded by termini 30 and 32, all centered about an axis 34. As also illustrated in FIG. 1a, interior wall 28 of cavity 26 is configured as a truncated right cylinder cone. Alternately, the cavity wall may be otherwise shaped, as exemplified in FIG. 1b, in which a cavity 26b is provided with a wall 28b having a truncated pyramid shape. While the configuration of wall 28b is shown as rectangular in shape, it is to be understood that any polygonal shape may be employed, subject only that the shape, whether conical or polygonal, is symmetrical about axis 34 or 34b. As a result, symmetrically-shaped cavity 26 and its termini 30 and 32 and all other symmetrically-shaped cavities, such as cavity 26b, are centered about their axes. Otherwise stated, if a line 36 passing through axis 34 were bisected into two segments 36a', and 36a" (FIG. 1a) or a line 36b passing through axis 34b were bisected into two segments 36b' and 36a" (FIG. 1b), the respective segments 36a', 36a" and 36b', 36b" would be equal to one another.

Terminus 30 is provided with a recess 40 disposed to fit onto chip 10, generally about its end 42 and, therefore, the two are similarly shaped. Terminus 32, which is smaller than terminus 30, is adapted to receive optic fiber 14 at its end 20 or, if desired, its core 16 and, therefore, operates as an entry portion for the optic fiber.

As illustrated in FIG. 2, to join optic fiber 14 and its core 16 with chip 10 and its connection point 12, an adhesive or fluid 46 of conventional index matching composition is placed within cavity 26, optic fiber 14 is inserted into entry portion or small terminus 32 of sleeve 22, core 16 is properly secured to connection point 12 in any manner necessary to minimize attenuation of optic signals, and the adhesive is cured. If desired, the adhesive may be inserted into the cavity after the optic fiber has been positioned therein. The resultant adhesive cures symmetrically in this position, due to the symmetrical shape of the sleeve interior wall and the multitude of equal segments 36a', 36a" and 36b', 36b" to eliminate undesired motion of the fiber from its preferred alignment position vis-a-vis connection point 12 or to provide a repeatable motion to achieve the optimum alignment position of the fiber with respect to the chip. The result is depicted in FIG. 3. If desired, for additional protection, sleeve 22 may be left in place or, alternatively, the sleeve may be removed to form the product shown in FIG. 4.

As a consequence, sleeve 22 controls, defines and confines index matching adhesive and/or fluid 46 between fiber end 44 and connection point 12 of chip 10. The sleeve defines the areas and volume actually in contact with the adhesive or fluid. By precisely controlling the volume and position of this material through the symmetrical shape of interior cavity wall 28, symmetry can be preserved over the effects of gravity and wicking which heretofore have prevented a very symmetrical pigtail which is necessary for performance and repeatability.

Although the invention has been described with respect to particular embodiments thereof, it should be realized that various changes and modifications may be made therein without departing from the spirit and scope of the invention.

What is claimed is:

1. A method for attaching an optic fiber to an optic chip and for maintaining alignment of the fiber at its end adjacent the chip, comprising the steps of:

positioning a sleeve having a symmetrically shaped cavity on the chip;

placing an adhesive into the sleeve cavity for being symmetrically shaped thereby;

inserting the fiber into the cavity;

securing the cavity into the chip;

curing, the adhesive whereby the adhesive, as symmetrically shaped by the cavity precisely position the fiber to the chip; and removing the sleeve from the chip after the adhesive has cured.

2. A method according to claim 1 further comprising the step of aligning the fiber within the cavity and positioning the fiber end adjacent the chip.

3. A method according to claim 1 further comprising the step of providing the sleeve cavity with a truncated pyramid configuration.

4. A method according to claim 1 further comprising the step of providing the sleeve cavity with a truncated right circular cone configuration.

5. A method for attaching an optic fiber to an optic chip and for maintaining alignment of the fiber at its end adjacent the chip, comprising the steps of:

utilizing a sleeve having a symmetrically shaped cavity;

placing an adhesive into the sleeve cavity for being symmetrically shaped thereby;

positioning the sleeve onto the chip;

inserting the fiber into the cavity;

aligning the fiber within the cavity and positioning the fiber end adjacent the chip;

securing the fiber to the chip;

curing the adhesive whereby the adhesive, as symmetrically shaped by the cavity, precisely position the fiber to the chip; and removing the sleeve from the chip after the adhesive has cured.

6. A method according to claim 5 further comprising the step of providing the sleeve cavity with a truncated pyramid configuration.

7. A method according to claim 5 further comprising the step of providing the sleeve cavity with a truncated right circular cone configuration.

* * * * *